United States Patent [19]

Tsuboi et al.

[11] Patent Number: 5,676,026
[45] Date of Patent: Oct. 14, 1997

[54] HYDRAULIC PRESSURE CONTROL SYSTEM

[75] Inventors: Yoshihiro Tsuboi; Hideki Wakamatsu, both of Wako, Japan

[73] Assignee: Honda Giken Kogyo Kabushiki Kaisha, Tokyo, Japan

[21] Appl. No.: 529,493

[22] Filed: Sep. 18, 1995

[30] Foreign Application Priority Data

Sep. 20, 1994 [JP] Japan ................................ 6-225239

[51] Int. Cl.$^6$ ........................... F16H 57/02; F16H 59/00
[52] U.S. Cl. ........................... 74/606 R; 474/18; 474/11; 474/28
[58] Field of Search ........................... 74/606 R; 474/28, 474/18, 11, 17

[56] References Cited

U.S. PATENT DOCUMENTS

| | | | |
|---|---|---|---|
| 4,091,690 | 5/1978 | Miyao | 474/18 X |
| 4,476,746 | 10/1984 | Miki et al. | 474/18 X |
| 4,534,243 | 8/1985 | Yokoyama et al. | 474/18 X |
| 4,547,178 | 10/1985 | Hayakawa et al. | 474/11 |
| 4,784,018 | 11/1988 | Okada et al. | 474/18 |
| 4,785,690 | 11/1988 | Yokoyama et al. | 474/18 |
| 4,867,732 | 9/1989 | Soga et al. | 474/28 |
| 4,875,892 | 10/1989 | Sueda | 474/17 |
| 5,169,366 | 12/1992 | Reniers | 474/28 |

*Primary Examiner*—Vinh T. Luong
*Attorney, Agent, or Firm*—Armstrong, Westerman, Hattori, McLeland & Naughton

[57] ABSTRACT

A valve body assembly for an automatic transmission formed by superimposing and clamping a torque converter casing, a first separation plate, a main valve body, a second separation plate, a second valve body, a third separation plate and a servo body. Pairs of first separation plates and pairs of second separation plates are provided, one pair for 7-position types of automatic transmissions and another pair for 6-position types of automatic transmissions and are, respectively, selected, used and assembled between the converter casing and main valve body and the main valve body and second valve body depending upon whether a 7-position type of transmission or a 6-position type of transmission is being assembled. Thus, general purpose properties are provided to the valve body assemblies used in hydraulic pressure control systems for 7-position type and 6-position type automatic transmissions for vehicles and the like.

9 Claims, 13 Drawing Sheets

6-position type

Parting face of torque converter casing

Parting face of main valve body

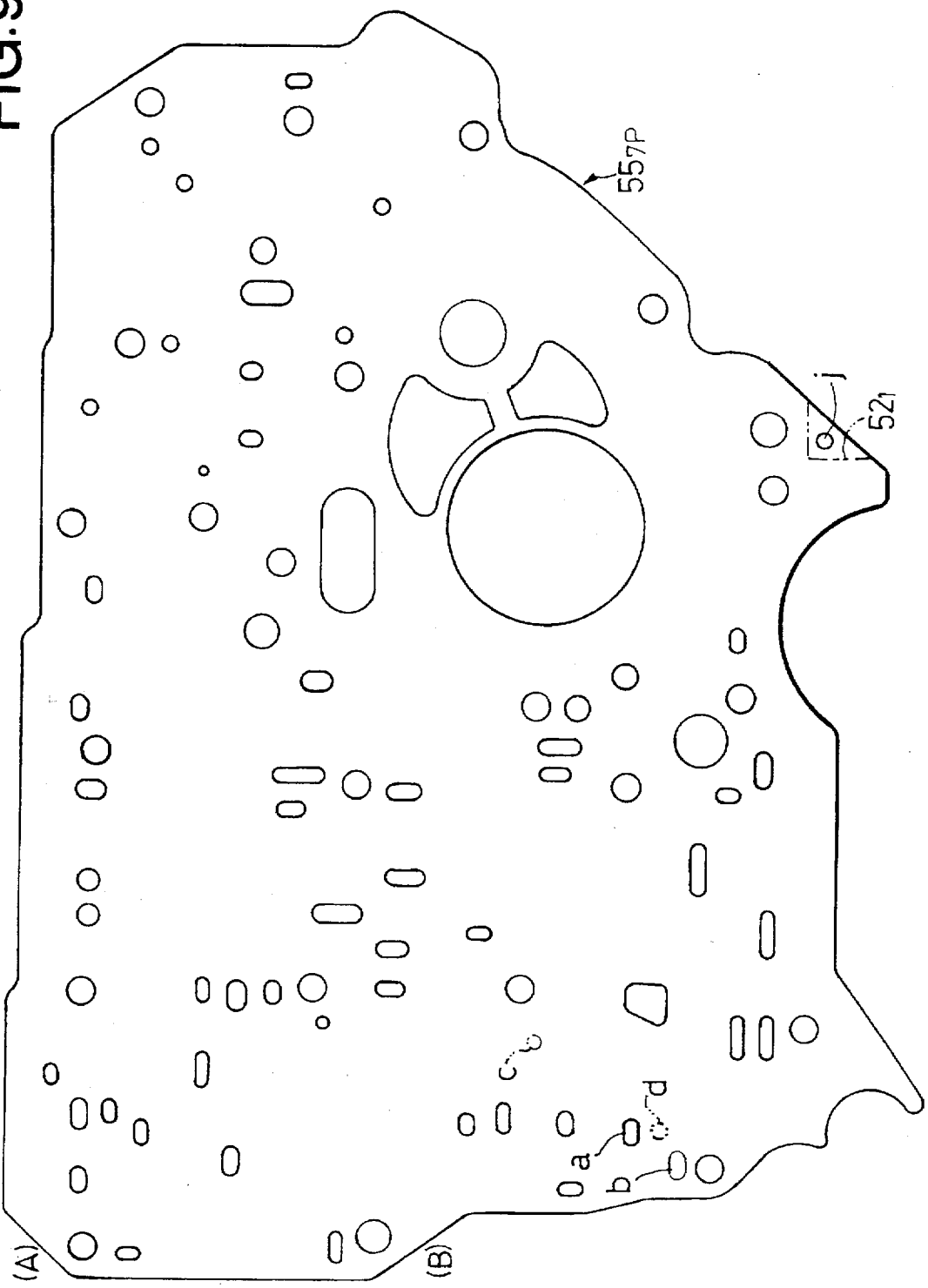

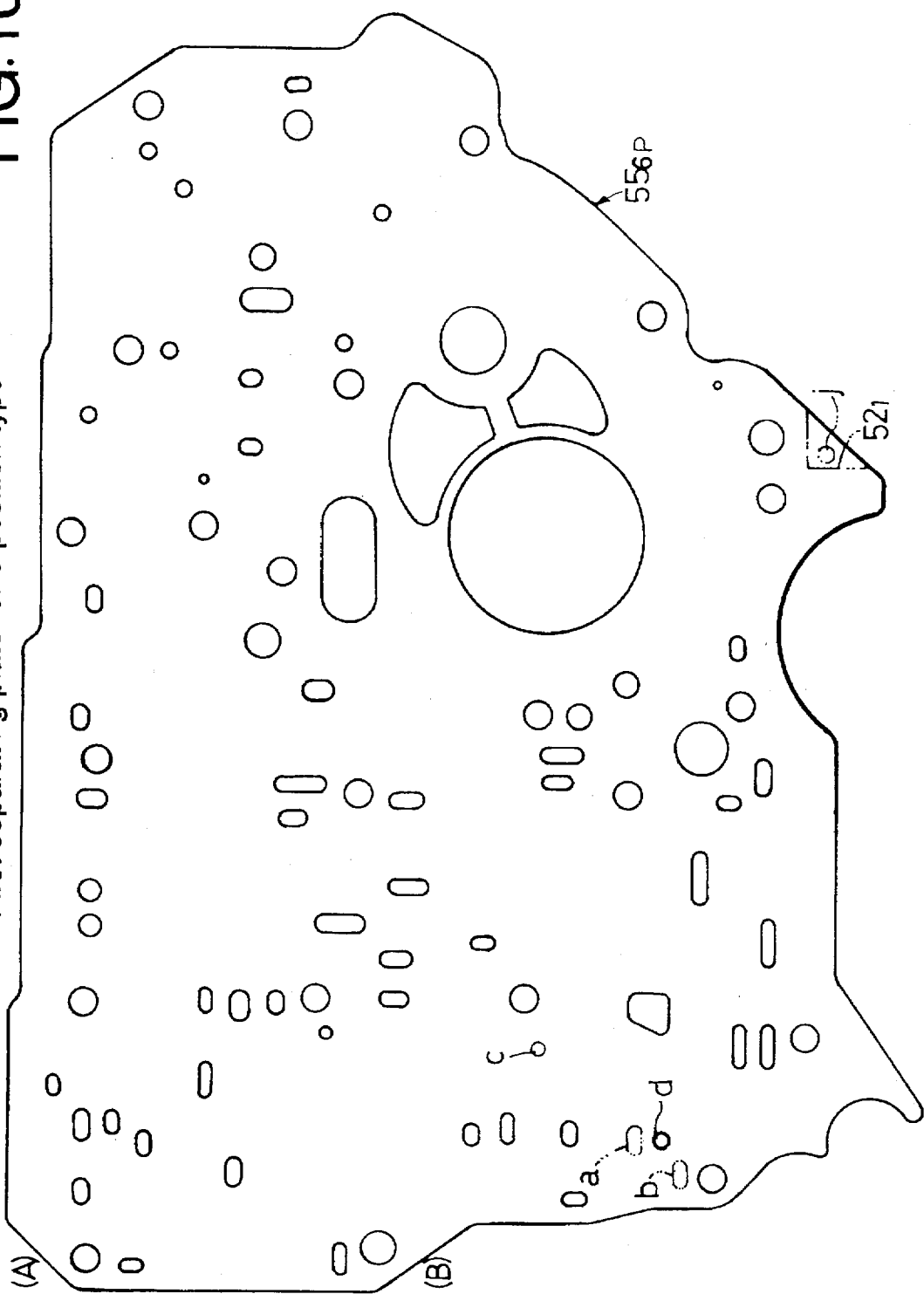

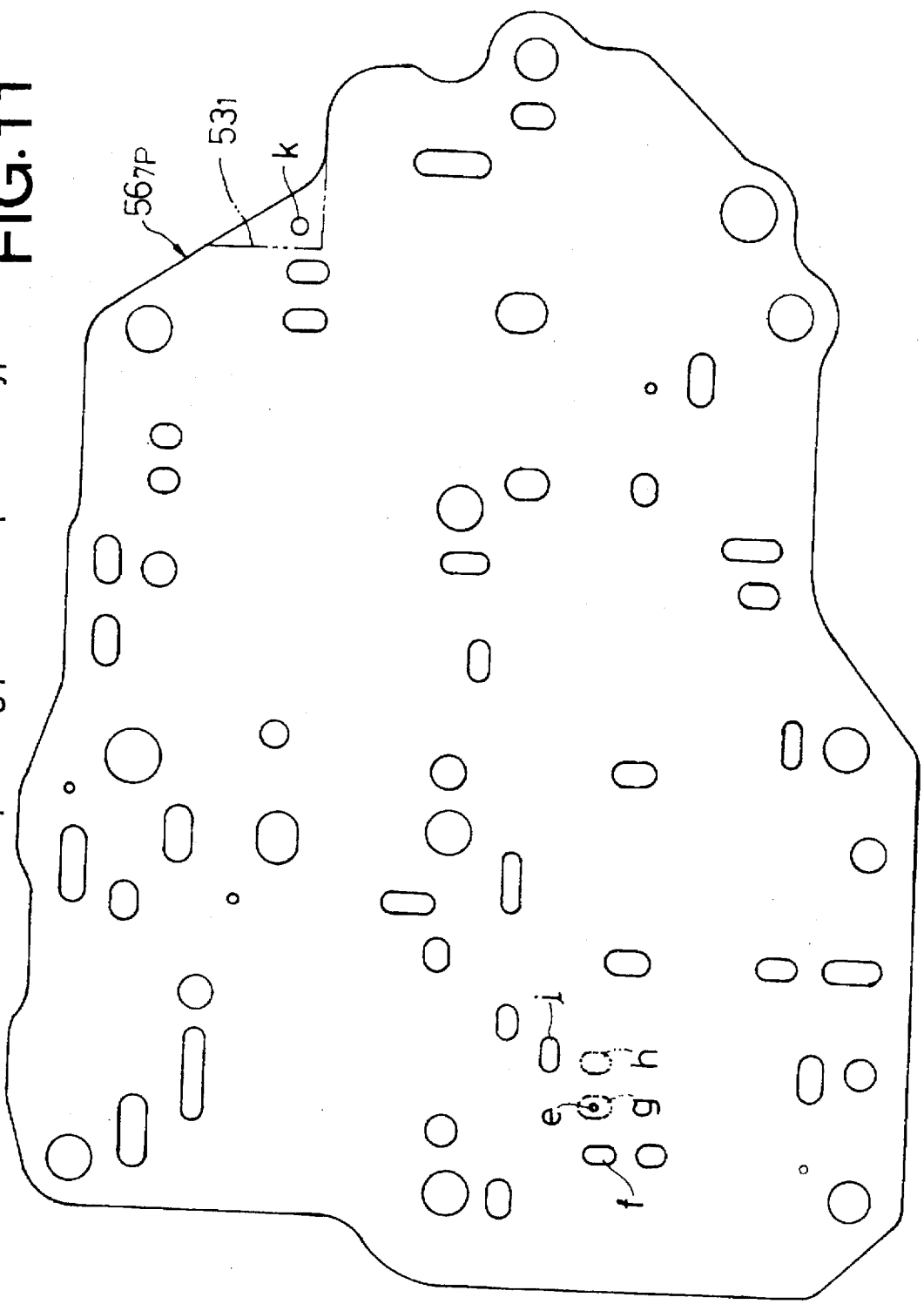
FIG.11 Second separating plate for 7-position type

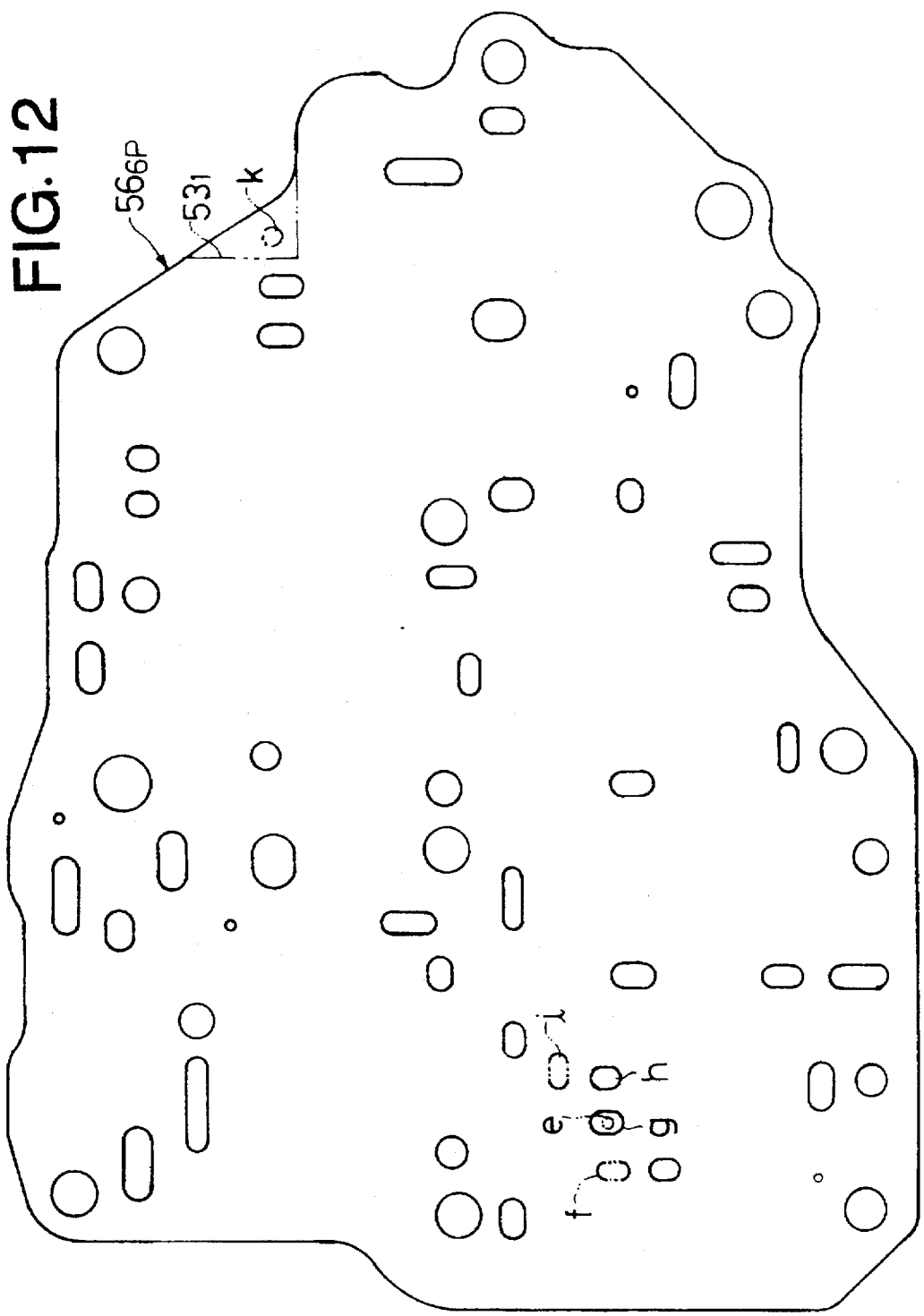

HYDRAULIC PRESSURE CONTROL SYSTEM

BACKGROUND OF THE INVENTION

1. Field of the Invention

The present invention relates to a hydraulic pressure control system including a valve body assembly having a plurality of oil passages formed therein.

2. Description of the Prior Art

For automatic transmissions, for example, for a vehicle using a hydraulic pressure control system including a valve body assembly, when a plurality of types of transmissions having different hydraulic pressure control circuits are installed in the valve body assembly, exclusive components, having different shapes and structures, are conventionally designed for the types of the transmissions in accordance with the difference between the hydraulic pressure control circuits.

However, if the exclusive components are used in accordance with the difference between the hydraulic pressure control circuits, as in the prior art, a following problem is encountered: types of components are rashly increased from demands, in functions, of the automatic transmissions, and the equipment cost of molds for producing the components and the like is increased, thereby causing an increase in cost of the entire transmission.

SUMMARY OF THE INVENTION

Accordingly, it is an object of the present invention to improve the general-purpose properties of the valve body assembly of the hydraulic pressure control system.

To achieve the above object, according to a first aspect and feature of the present invention, there is provided a hydraulic pressure control system including a valve body assembly, having a plurality of oil passages formed therein, wherein the valve body assembly comprises at least two members superimposed and clamped on each other, one of the two members, opposed to each other, conducting a switching-over of a communication condition of the oil passages provided in the other member to be switched over.

With the above first feature of the present invention, it is possible to switch over the communication of the oil passage in the other member only by replacing the one member, thereby enabling the accommodation to many types at a decreased number of components and a decreased cost.

According to a second aspect and feature of the present invention, in addition to the first feature, the switching-over of the communication condition of the oil passages is a switching-over of the connection of the oil passage to another oil passage, a switching-over of the connection and disconnection of the oil passages, or a switching-over of the presence and absence of a throttle.

With the above second feature of the present invention, it is possible to accommodate oil passages having various functions.

According to a third aspect and feature of the present invention, in addition to any of the first or second feature, the one member is a separating plate, and the other member is a valve body which has a hydraulic pressure control valve incorporated therein and a plurality of oil passages formed therein.

With the third feature of the present invention, it is possible to switch over the communication condition of the oil passages only by replacing the separating plate easy to produce, leading to a further reduction in cost.

According to a fourth aspect and feature of the present invention, in addition to any of the first, second and third features, the one member includes an identification mark which can be seen from outside.

With the fourth feature of the present invention, the assembled component can easily be seen from outside to prevent mis-assembling.

According to a fourth aspect and feature of the present invention, in addition to any of the first, second third and fourth features, the valve body assembly is used for control of a hydraulic pressure in an automatic transmission for a vehicle, and the one member is for switching-over the number of shifting hydraulic engage elements.

With the fifth feature of the present invention, it is possible to produce a plurality of types of automatic transmissions for a vehicle, including different numbers of shifting hydraulic engage elements, at a low cost.

The above and other objects, features and advantages of the invention will become apparent from the following description of a preferred embodiment taken in conjunction with the accompanying drawings.

BRIEF DESCRIPTION OF THE DRAWINGS

FIG. 9 is a view taken along a line 9—9 in FIG. 6;

FIG. 10 is a view of the a first separating plate for the 6-position type, similar to FIG. 6;

FIG. 11 is a view taken along a line 11—11 in FIG. 6;

FIG. 12 is a view of a second separating plate for the 6-position type, similar to FIG. 11.

DESCRIPTION OF THE PREFERRED EMBODIMENT

The present invention will now be described by way of a preferred embodiment with reference to the accompanying drawings.

Figure 1:
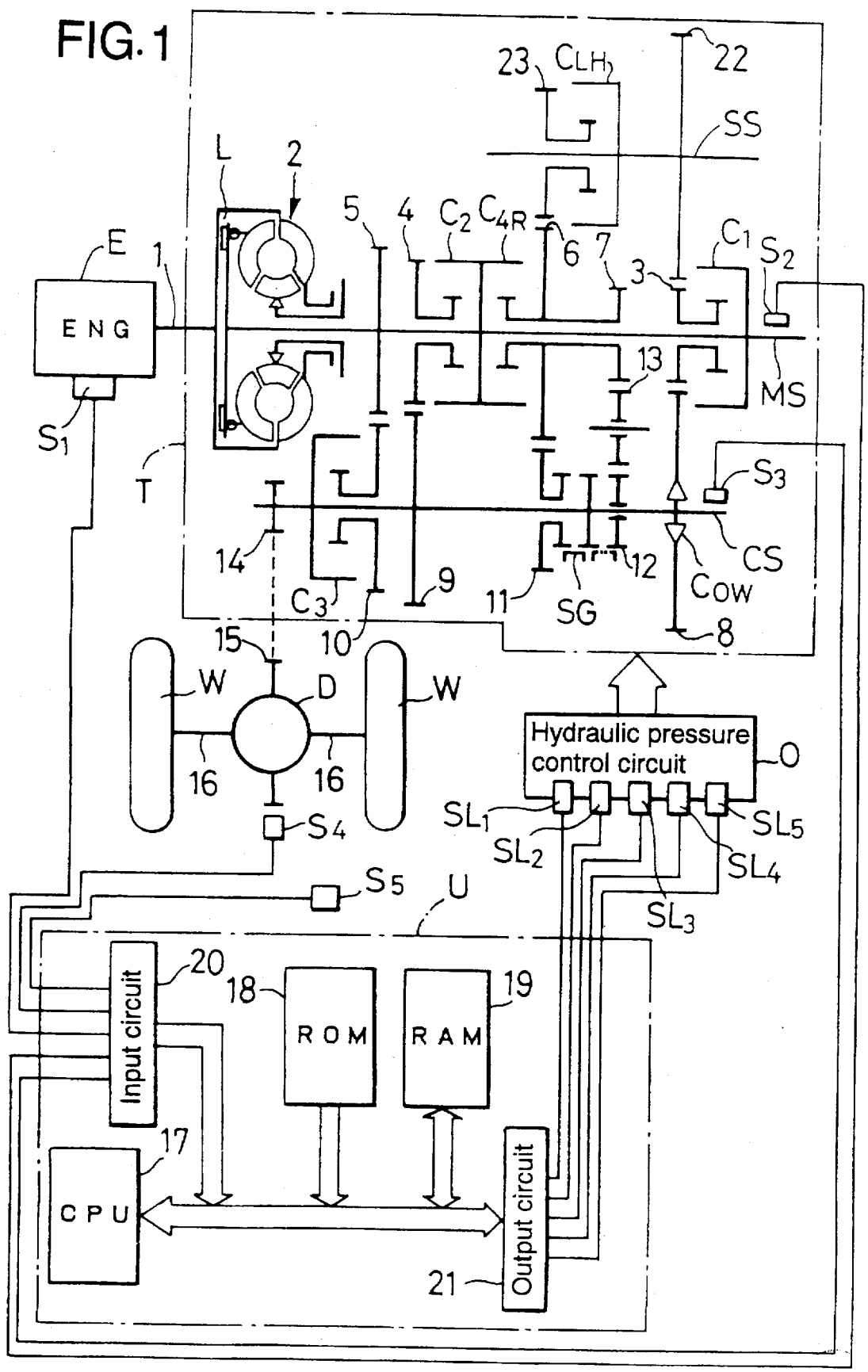
FIG. 1 is a schematic illustration of the entire arrangement of a 7-position type automatic transmission for a vehicle and a control system according to the present invention.

Referring to FIG. 1, there is shown a 7-position automatic transmission T for a vehicle, which is capable of selecting, by a selection lever, any of the following seven ranges: a "P" range (a parking range), an "R" range (a reverse range), an "N" range (a neutral range), a "D4" range (a first-shift to fourth-shift automatic shiftable range), a "D3" range (a first-shift to third-shift automatic-shiftable range), a "2"

range (a second-shift fixing range, including a downshifting from a third gear-shift stage to a second gear-shift stage), and a "1" range (a first gear-shift fixing range, including a downshifting from a second gear-shift stage to a first-shift holding gear-shift stage).

The automatic transmission T includes a main shaft MS connected to a crankshaft 1 of an engine E through a torque converter 2 having a lock-up clutch L, and counter shaft CS, and a secondary shaft SS which are disposed in parallel to the main shaft MS.

Carried on the main shaft MS are a main first-shift gear 3, a main second-shift gear 4, a main third-shift gear 5, a main fourth-shift gear 6 and a main reverse gear 7. Carried on the counter shaft CS are a counter first-shift gear 8 meshed with the main first-shift gear 3, a counter second-shift gear 9 meshed with the main second-shift gear 4, a counter third-shift gear 10 meshed with the main third-shift gear 5, a counter fourth-shift gear 11 meshed with the main fourth-shift gear 6, and a counter reverse gear 12 connected to the reverse gear 7 through a reverse idle gear 13.

When the main first-shift gear 3, relatively rotatably carried on the main shaft MS, is coupled to the main shaft MS by a first-shift clutch $C_1$, the first gear-shift stage is established. The first-shift clutch $C_1$ is retained in its engaged state even when second to fourth gear-shift stages are established and hence, the counter first-shift gear 8 is supported through a one-way clutch $C_{OW}$. When the main second-shift gear 4, relatively rotatably carried on the main shaft MS, is coupled to the main shaft MS by a second-shift clutch $C_2$, the second gear-shift stage is established. When the counter third-shift gear 10, relatively rotatably carried on the counter shaft CS, is coupled to the counter shaft CS by a third shift clutch $C_3$, the third gear-shift stage is established.

When the main fourth-shift gear 6, relatively rotatably carried on the main shaft MS, is coupled to the main shaft MS by a fourth-shift-reverse clutch $C_{4R}$, in a condition in which the counter fourth-shift gear 11 relatively rotatably carried on the counter shaft CS, has been coupled to the counter shaft CS by a selector gear SG, a fourth gear-shift stage is established. When the counter reverse gear 12, relatively rotatably carried on the counter shaft CS, is coupled to the main shaft MS by a fourth-shift-reverse clutch $C_{4R}$, in a condition in which the counter reverse gear 12, relatively rotatably carried on the counter shaft CS, has been coupled to the counter shaft CS by the selector gear SG, a reverse gear-shift stage is established.

The rotation of the counter shaft CS is transmitted, through a final drive gear 14 and a final driven gear 15, to a differential D and then, form the differential D, through left and right axles 16, 16, to driving wheels W, W.

Further, a first secondary first-shift gear 22 is fixedly mounted on a secondary shaft SS, and a second secondary first-shift gear 23 is relatively rotatably carried on the secondary shaft SS. The second secondary first-shift gear 23 is capable of being coupled to the secondary shaft SS by a first-shift holding clutch $C_{LH}$. When the first-shift holding clutch $C_{LH}$ is brought into an engaged state in which the first-shift clutch $C_1$ has been brought into an engaged state, a first-shift holding gear-shift stage is established.

If the first-shift holding gear-shift stage is established when the subject vehicle ascends a steep slope, or when the subject vehicle tows another vehicle, the transmission of a power from the main shaft MS to the counter shaft CS is performed by means of a first path via the first-shift clutch $C_1$, the main first-shift gear 3, the counter first-shift gear 8 and the one-way clutch $C_{OW}$, and a second path via the first-shift clutch $C_1$, the main first-shift gear 3, the first secondary first-shift gear 22, the second shaft SS, the first-shift holding clutch $C_{LH}$, the second secondary first-shift gear 23, the main fourth-shift gear 6, the counter fourth-shift gear 11 and the selector gear SG. Therefore, a good-efficiency transmission of power can be achieved. If the first-shift holding gear-shift stage is established when an engine brake is required, the torque of the driving wheels W, W can be transmitted back to the engine E, even if the one-way clutch $C_{OW}$ slips.

An electronic control unit U includes a CPU 17, a ROM 18, a RAM 19, an input circuit 20 and an output circuit 21.

Inputted to the input circuit 20 of the electronic control unit U are a throttle opening degree TH, detected by a throttle opening degree sensor $S_1$ mounted in the engine E, a main shaft rotation-number $N_{MS}$, detected by a main shaft rotation-number sensor $S_2$ mounted on the main shaft MS, a counter shaft rotation-number $N_{CS}$, detected by a counter shaft rotation-number sensor $S_3$ mounted on the counter shaft CS, a vehicle speed V, detected by a vehicle speed sensor $S_4$ mounted on the differential D, and a selection lever position S, detected by a selection lever position sensor $S_5$.

On the other hand, the output circuit 21 of the electronic control unit U is connected to shift solenoids $SL_1$ and $SL_2$ and lock-up clutch solenoids $SL_3$ and $SL_4$ and a shifting clutch hydraulic solenoid $SL_5$, mounted in a hydraulic pressure control circuit O to control the operations of the first-shift clutch $C_1$, the second-shift clutch $C_2$, the third-shift clutch $C_3$, the fourth-shift-reverse clutch $C_{4R}$, the first-shift holding clutch $C_{LH}$, the selector gear SG and the lock-up clutch L of the automatic transmission T.

The hydraulic pressure control circuit O of the 7-position type automatic transmission T will be described with reference to FIG. 2.

The hydraulic pressure control circuit O of the automatic transmission T includes a regulator valve 31, a manual valve 32, a modulator valve 33, a throttle valve 34, a servo valve 35, a D inhibitor valve (D-1NH valve) 36, a 1–2 shifting valve 37, a 2–3 shifting valve 38, a 3–4 shifting valve 39, a 3–4 orifice control valve (3–4 OC valve) 40, a secondary orifice control valve (second OC valve) 41, a clutch pressure control valve (CPC valve) 42, a clutch pressure back-up valve (CPB valve) 43, a four-shift exhaust valve 44, a relief valve 45 and a cooler relief valve 46.

The regulator valve 31 regulates the hydraulic pressure of a working oil pumped from an oil tank 25 by an oil pump 26 into a predetermined line pressure, and distributes the working oil to various lubricated portions of the main shaft MS, the counter shaft CS and the secondary shaft SS, and the torque converter 2.

The manual valve 32 is operated in mechanical association with the selection lever and stopped at a position corresponding to any of the "P" range, the "R" range, the "N" range, the "D4" range, the "D3" range, the "2" range and the "1" range to perform the switching-over of the oil passage corresponding to each of the ranges.

The modulator valve 33 modulates the line pressure delivered by the regulator valve 31 into a modulator pressure for controlling the shifting to supply the modulator pressure through the shift solenoids $SL_1$ and $SL_2$ to the 1–2 shifting valve 37, the 2–3 shifting valve 38 and the 2–4 shifting valve 39. The modulator pressure is also supplied through the lock-up clutch solenoids $SL_3$ and $SL_4$ to the hydraulics pressure circuit of the lock-up clutch L of the torque converter 2 (see FIG. 1).

The throttle valve 34 is operated, by the shifting clutch hydraulic pressure solenoid $SL_S$, to regulate the modulator pressure into a throttle pressure corresponding to the throttle opening degree. The throttle pressure is supplied to the CPC valve 42 and the CPB valve 43 and also to the hydraulic pressure circuit of the lock-up clutch L of the torque converter 2.

The servo valve 35 drives the selector gear SG, and is moved leftwardly, upon establishment of the forward gear-shift stage, to couple the counter 4-shift gear 11 to the counter shaft CS, and moved rightwardly, upon establishment of the backward gear-shift stage, to couple the counter reverse gear 12 to the counter shaft CS.

The D-1NH valve 36 controls the operation of the servo valve 35. Thus, when the selection lever is shifted to the forward travel range, such as the "D4" range during backward traveling of the vehicle in the "R" range, the supplying of the line pressure from the manual valve 32 to a right oil chamber in the servo valve 35 is cut to inhibit the leftward movement of the servo valve, until the first-shift clutch pressure is risen up to a predetermined pressure. During this time, the inertial rotation of the counter shaft CS, caused by the releasing of the fourth-shift-reverse clutch $C_{4R}$, is braked by the gradual engagement of the first-shift clutch $C_1$ to reduce the difference in relative rotation between input and output of the selector gear SG. When the first-shift clutch pressure has risen to the predetermined pressure, the line pressure is supplied to a right oil chamber in the servo valve 35 in response to the operation of the D-1NH valve 36 to move the servo valve 35 leftwardly in order to couple the counter 4-shift gear 11 to the counter shaft CS.

Each of the 1-2 shifting valve 37, the 2-3 shifting valve 38 and the 3-4 shifting valve 39 automatically selects each of the gear-shift stages in the "D4" range, the "D3" range, the "2" range and the "1" range. The modulator pressure and a spring pressure are applied to the 1-2 shifting valve 37, the 2-3 shifting valve 38 and the 3-4 shifting valve 39. A clutch pressure is supplied selectively to any of the first-shift clutch $C_1$, the second-shift clutch $C_2$, the third-shift clutch $C_3$, the fourth-shift-reverse clutch $C_{4R}$ and the first-shift holding clutch $C_{LH}$ by switching-over by the turning ON/OFF of the shift solenoids $SL_1$ and $SL_2$.

The 3-4 OC valve 40 controls the releasing of the second-shift, or third-shift clutch pressure, by controlling the timing of opening of an orifice in order to moderate a shifting shock upon upshifting from the second or third gear-shift to the fourth gear-shift.

The second OC valve 41 controls the releasing of the second-shift clutch pressure by controlling the timing of opening and closing of the orifice in order to moderate a shifting shock upon upshifting from the second gear-shift to the third gear-shift.

The CPC valve 42 controls the line pressure in a reducing manner in a range of low throttle opening degree.

The CPB valve 43 controls the timing of releasing of the fourth-shift clutch pressure and the third-shift clutch pressure, and controls the communication of an oil passage free of a throttle and provided in parallel to a throttle in an oil passage with the fourth-shift-reverse clutch $C_{4R}$ in the "R" range.

The fourth-shift exhaust valve 44 more perfects the releasing of the fourth-shift clutch pressure during switching-over between the forward and backward movements of the vehicle.

The relief valve 45 defines an upper limit for the pressure of the working oil supplied as a lubricating oil to the various lubricated portions of the automatic transmission T.

The cooler relief valve 46 defines a flow rate of the working oil to an oil cooler 27.

Figure 4:
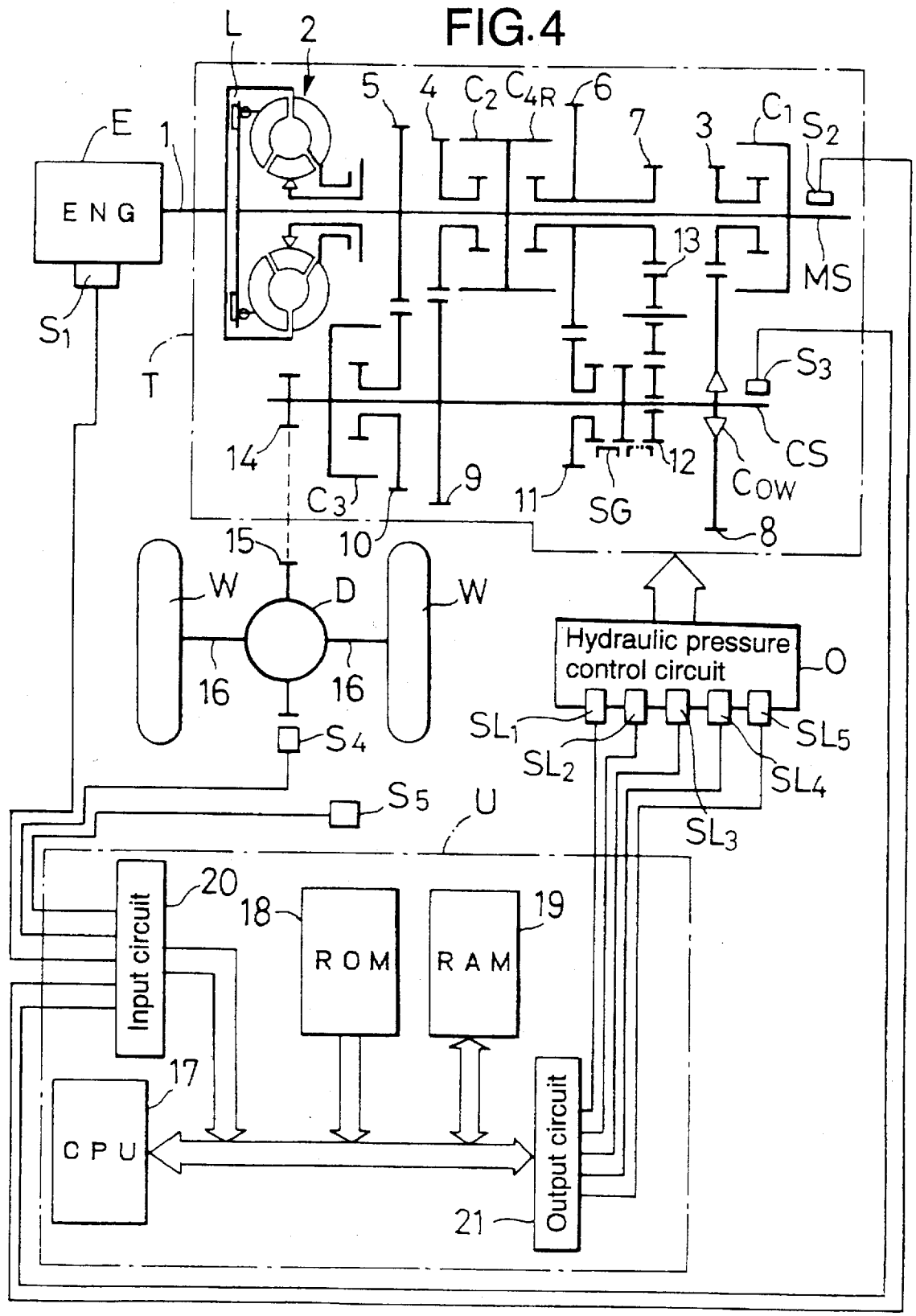
FIG. 4 is a schematic illustration of the entire arrangement of a 6-position type automatic transmission for a vehicle and a control system according to the present invention.

The structure of a 6-position type automatic transmission T for a vehicle will be described below with reference to FIG. 4. The 6-position type automatic transmission T is capable of selecting, by a selection lever, any of the following six ranges: a "P" range (a parking range), an "R" range (a reverse range"), an "N" range (a neutral range), a "D4" range (a first-shift to fourth-shift automatic shifting range), a "D3" range (a first-shift shift to third-shift automatic-shifting range), and a "2" range (a second-shift fixing range, including a downshifting from a third gear-shift stage to a second gear-shift stage).

The 6-position type automatic transmission T is partially different in structure from the above-described 7-position type automatic transmission T. More specifically, as can be seen from comparison of FIG. 4 with FIG. 1, the 6-position type automatic transmission T has no first-shift holding gear-shift stage and hence, does not include any of the secondary shaft SS, the first secondary first-shift gear 22, the second secondary first-shift gear 23 and the first-shift holding clutch $C_{LH}$.

A hydraulic pressure control circuit O in the 6-position type automatic transmission T is slightly different from the hydraulic pressure control circuit O in the 7-position type automatic transmission T, due to the absence of the first-shift holding clutch $C_{LH}$, but the type and number of the valves used are substantially the same as those in the 7-position type automatic transmission T. The difference between both the automatic transmission T will be described in detail.

The structures of valve body assemblies of the 7-position type and 6-position type automatic transmission T will be described below.

Figure 6A:
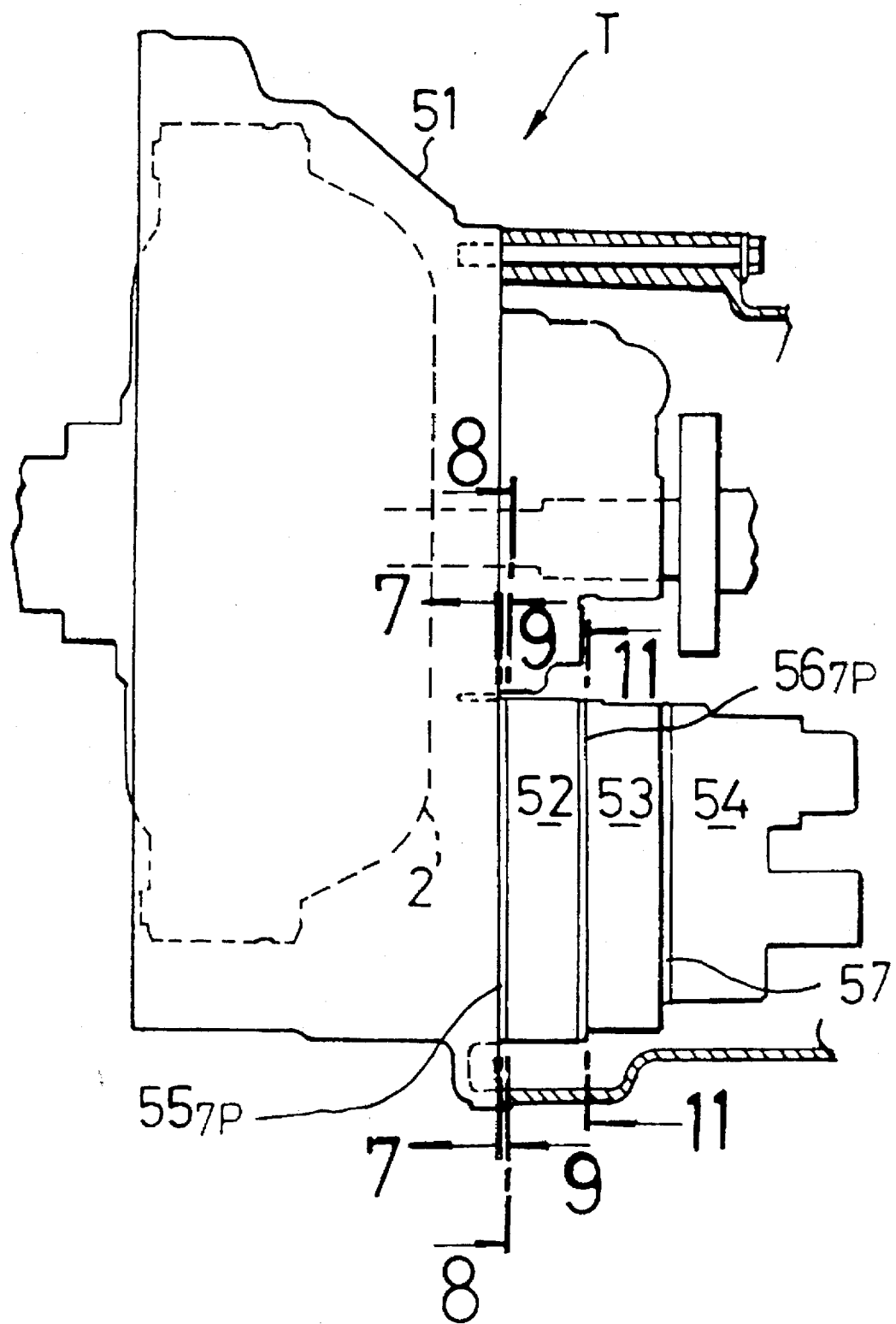
FIG. 6A is a partial sectional view of the automatic transmission of a 7-position type showing the plate arrangement.
Figure 6B:
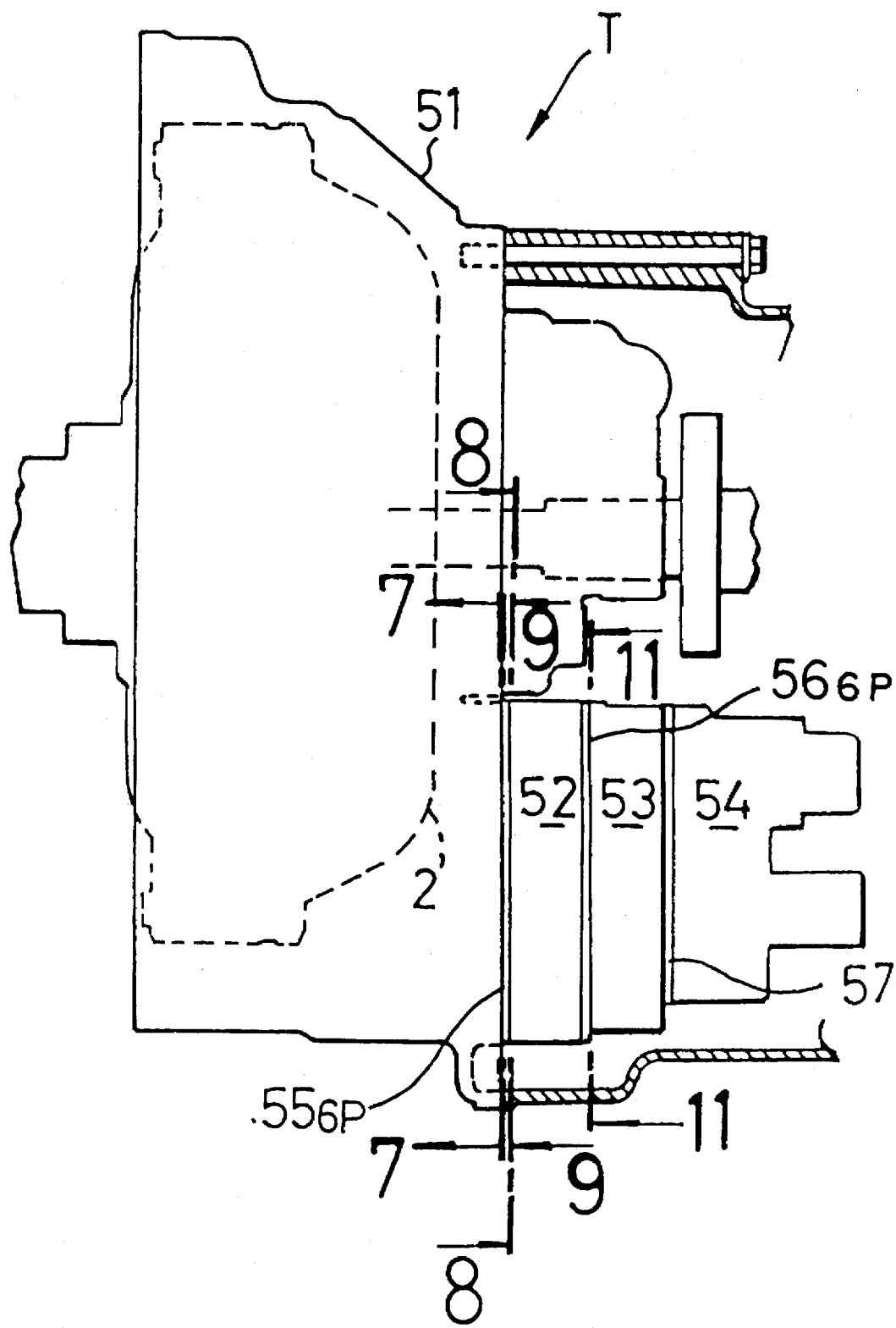
FIG. 6B is a partial sectional view of the automatic transmission of a 6-position type showing the plate arrangement.

As shown in FIGS. 6A, 6B the automatic transmissions T includes a torque converter casing 51 which accommodates the torque converter 2 therein. A main valve body 52, a secondary valve body 53 and a servo body 54 are coupled in a superimposed and clamped fashion, that is, one on the other, to the torque converter casing 51. A first separating plate $55_{7P}$, FIG. 6A, $55_{6P}$, FIG. 6B, is clamped between the torque converter casing 51 and the main valve body 52. A second separating plate $56_{7P}$ FIG. 6A, $56_{6P}$, FIG. 6B, is clamped between the main valve body 52 and the secondary valve body 53. A third separating plate 57, FIGS. 6A, 6B, is clamped between the secondary valve body 53 and the servo body 54.

Figure 2:
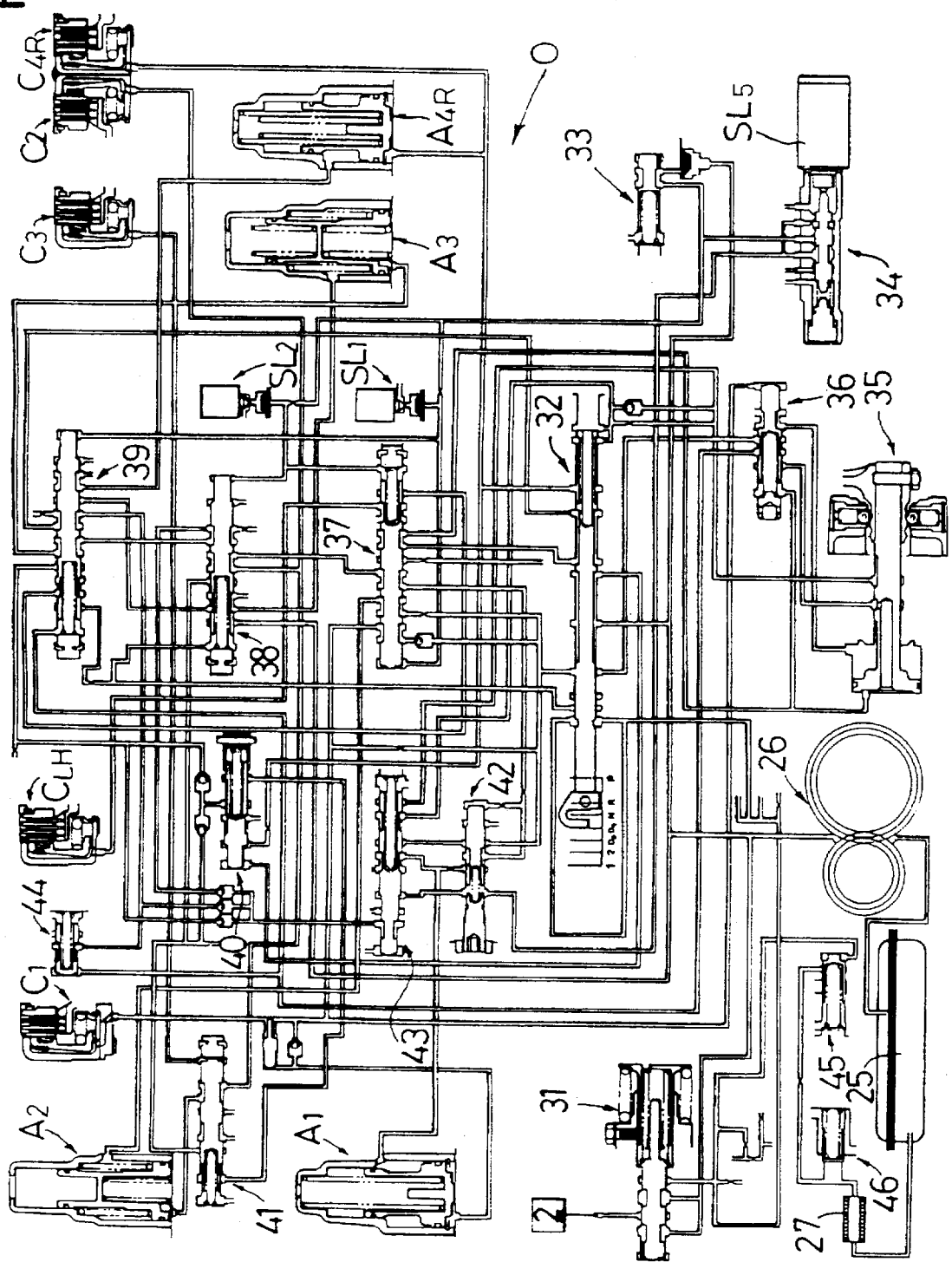
FIG. 2 is a schematic illustration of a hydraulic pressure circuit in the automatic transmission.

The manual valve 32 and the 1-2 shifting valve 37, FIG. 2, are accommodated in the main valve body 52. The 2-3 shifting valve 38 and the 3-4 shifting valve 39, FIG. 2, are accommodated in the secondary valve body 53. Accumulators $A_1$, $A_2$, $A_3$ and $A_{4R}$ and the servo valve 35, FIG. 2, are accommodated in the servo body 54.

The torque converter casing 51, the main valve body 52, the secondary valve body 53, the servo body 54 and the third separating plate 57 are commonly used in both the 7-position type, FIG. 6A, and 6-position type, FIG. 6B, automatic transmissions T. The first separating plates $55_{7P}$, FIG. 6B, and $55_{6P}$ and the second separating plates $56_{7P}$ and $56_{6P}$, FIG. 6B are used in the 7-position type and 6-position type automatic transmission T, respectively. In other words, when the automatic transmission T is of the 7-position type FIG. 6A, the first separating plate $55_{7P}$ and the second separating plate $56_{7P}$ are used. When the automatic transmission T is of the 6-position type, FIG. 6B, the first separating plate $55_{6P}$ and the second separating plate $56_{6P}$ are used.

Figure 3:
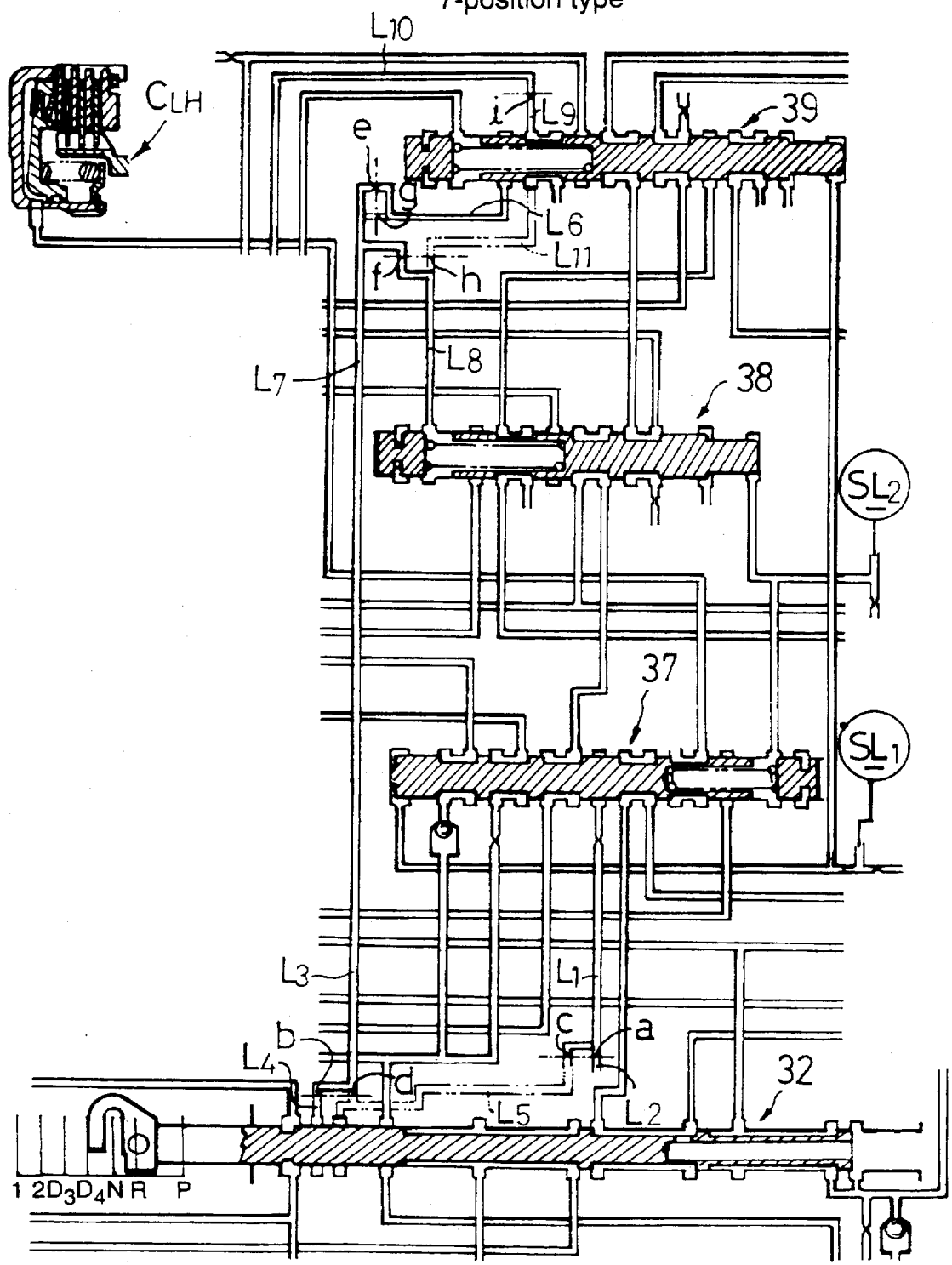
FIG. 3 is an enlarged illustration of an essential portion shown in FIG. 2.
Figure 5:
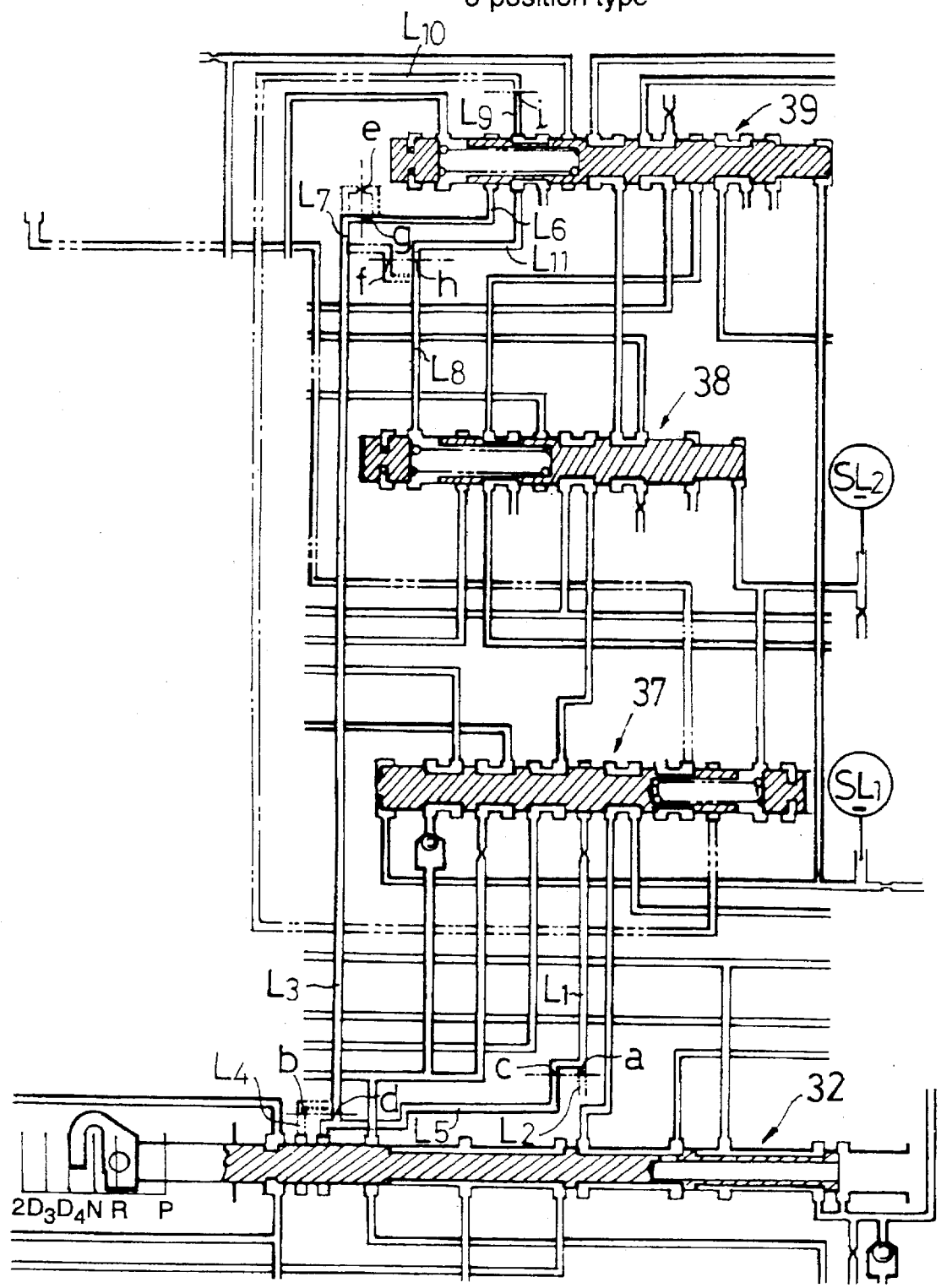
FIG. 5 is an enlarged illustration of an essential portion of a hydraulic pressure circuit in the automatic transmission of FIG. 4.

When the first separating plate $55_{7P}$ and the second separating plate $56_{7P}$ for the 7-position type, FIG. 6A, are used, the oil passages in the hydraulic pressure circuit are as shown in FIG. 3. When the first separating plate $55_{6P}$ and the second separating plate $56_{6P}$ for the 6-position type, FIG. 6B, are used, the oil passages in the hydraulic pressure circuit are as shown in FIG. 5.

As can be seen from FIG. 9, the first separating plate $55_{7P}$ for the 7-position type has an oil hole a, an oil hole b and an identification hole j. As can be seen from FIG. 10, the first separating plate $55_{6P}$ for the 6-position type has an oil hole c and an oil hold d in place of having no oil holes a and b and no identification hole j. When the first separating plate $55_{7P}$ and $55_{6P}$ for the 7- and 6-position types are superimposed and clamped between the torque converter casing 51 and the main valve body 52, the (A) and (B) position s shown in FIGS. 7 to 10 correspond to one another.

Figure 7:
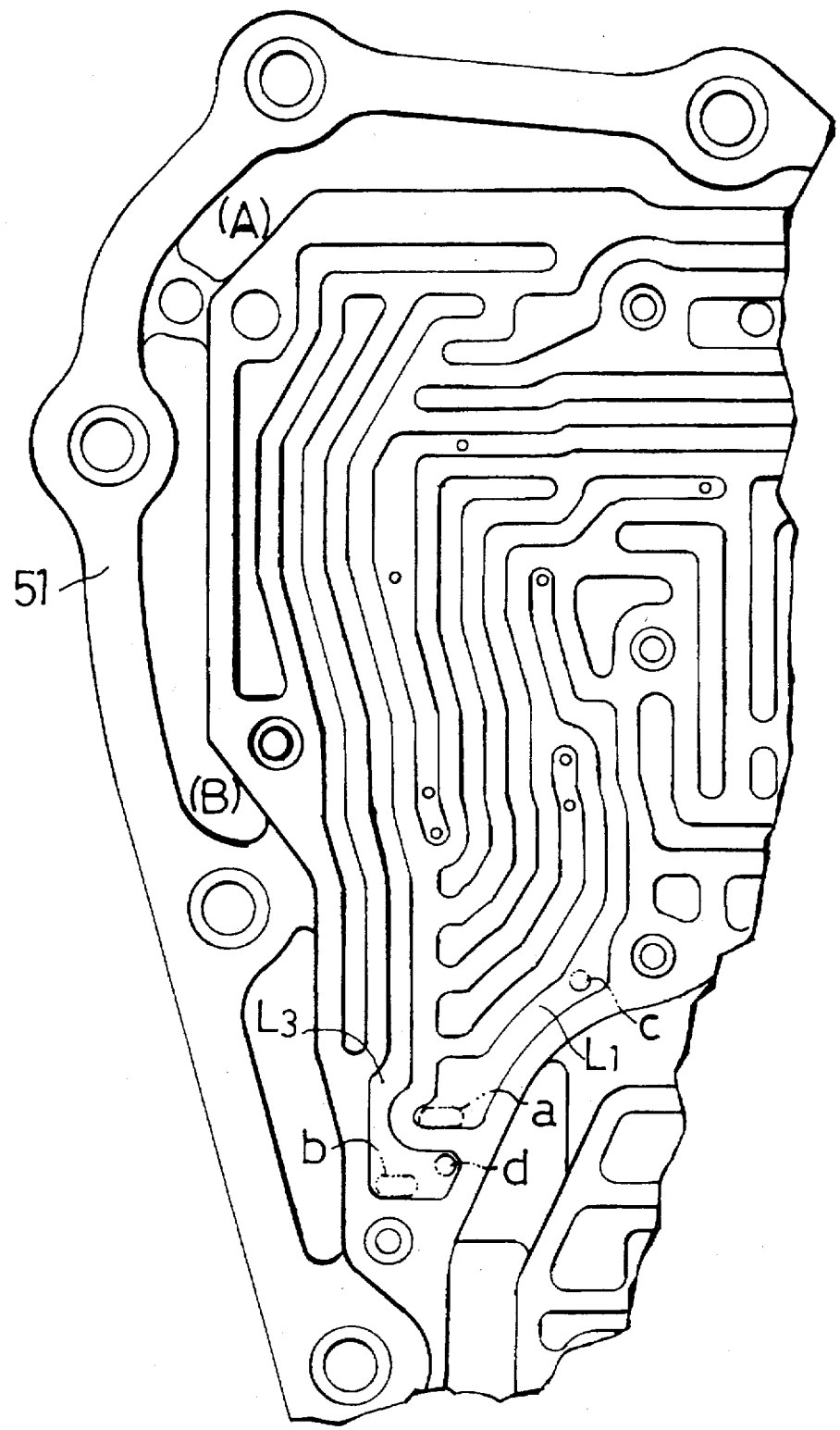
FIG. 7 is a view taken along a line 7—7 in FIG. 6.
Figure 8:
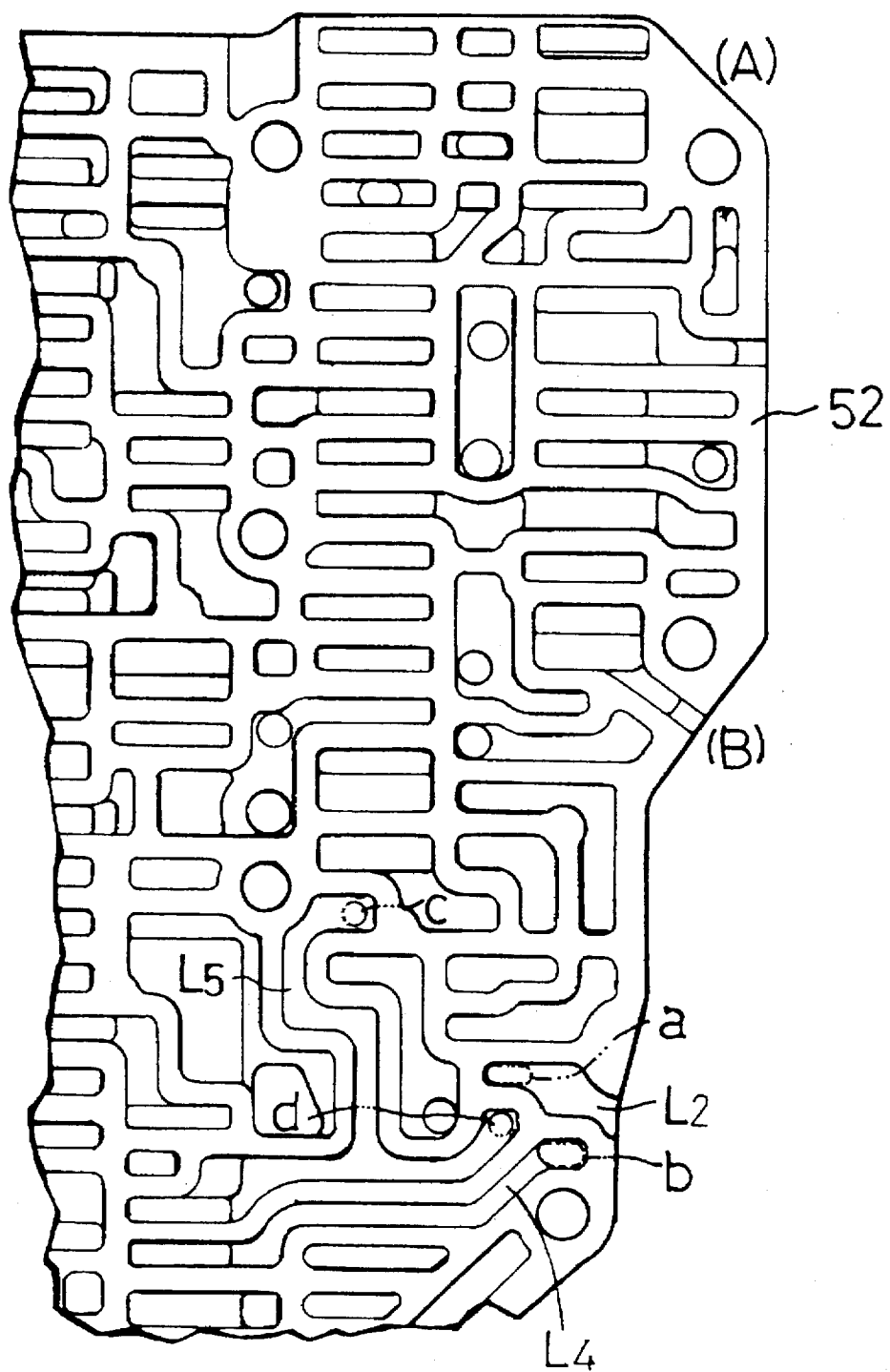
FIG. 8 is a view taken along a line 8—8 in FIG. 6.

When the first separating plate $55_{7P}$ for the 7-position type shown in FIG. 9 is clamped between the torque converter casing 51 shown in FIG. 7 and the main valve body 52 shown in FIG. 8, an oil passage $L_1$, in the torque converter casing 51 connected to the 1–2 shifting valve 37 accommodated in the main valve body 52, is put into communication with an atmosphere-opened oil passage $L_2$ in the main valve body 52 through the oil hole a, and an oil passage $L_3$ in the torque converter casing 51 is put into communication with an oil passage $L_4$ in the main valve body 52, as can be seen also from FIG. 3. At the same time, the oil passage $L_1$, in the torque converter casing 51, and the oil passage $L_3$ are put out of communication with an oil passage $L_5$ in the main valve body 52 by the first separating plate $55_{7P}$ for the 7-position type.

When the second separating plate $56_{7P}$ for the 7-position type, shown in FIG. 11, is clamped between the main valve body 52 and the secondary valve body 53, as can be seen also from FIG. 3, an oil passage $L_6$ in the secondary valve body 53 is put into communication with an oil passage $L_7$ in the main valve body 52 through an orifice e provided in the second separating plate $56_{7P}$ and at the same time, an oil passage $L_8$ in the secondary valve body 53 is put into communication with the oil passage $L_7$ in the main valve body 52 through an oil hole f and further, an oil passage $L_9$ in the secondary valve body 53 is put into communication with an oil passage $L_{10}$ in the main valve body 52. At the same time, the oil passage $L_8$ in the secondary valve body 53 and an oil passage $L_{11}$ connected to the 3–4 shifting valve 39 accommodated in the secondary valve body 53 are put out of communication with each other by the second separating plate $56_{7P}$ for the 7-position type. The second separating plate $56_{7P}$ for the 7-position type has an identification hole k.

When the first separating plate $55_{6P}$ for the 6-position type shown in FIG. 10 is clamped between the torque converter casing 51 shown in FIG. 7 and the main valve body 52 shown in FIG. 8, as can be seen also from FIG. 5, the oil passage $L_5$ in the main valve body 52 is put into communication with the oil passage $L_1$ in the torque converter casing 51 and the oil passage $L_3$ through the oil hole c and an oil hole d, respectively, and the oil passages $L_2$ and $L_4$ in the main valve body 52 are put out of communication with the oil passages $L_1$ and $L_3$ in the torque converter casing 51 by the first separating plate $55_{6P}$ for the 6-position type, respectively, as can be seen also from FIG. 5.

When the second separating plate $56_{6P}$, for the 6-position type shown in FIG. 12, is clamped between the main valve body 52 and the secondary valve body 53, the oil passage $L_6$, in the secondary valve body 53, is put into communication with the oil passage $L_7$ in the main valve body 52 through an oil passage g, and the oil passage $L_6$, in the secondary valve body 53, and the oil passage $L_{11}$, provided in the main valve body 52 communicating with the 3–4 shifting valve 39 accommodated in the secondary valve body 53, are put into communication with each other through an oil hole h, as can be seen also from FIG. 5. At the same time, the oil passages $L_8$ and $L_9$ in the secondary valve body 53, are put out of communication with the oil passages $L_7$ and $L_{10}$ in the main valve body 52 by the second separating plate $56_{6P}$ for the 6-position type, respectively. The second separating plate $56_{6P}$ for the 6-position type has no identification hole k.

When the torque converter casing 51, the first separating plate $55_{7P}$, $55_{6P}$, the main valve body 52, the second separating plate $56_{7P}$, $56_{6P}$, the secondary valve body 53, the third separating plate 57 and the servo body 54 are assembled together, a portion of the first separating plate $55_{7P}$, $55_{6P}$ is exposed from a notch $52_1$ of the main valve body 52, and a portion of the second separating plate $56_{7P}$, $56_{6P}$ is exposed from a notch $53_1$ of the secondary valve body 53. At this time, if the identification holes j and k can be visually viewed from the notches $52_1$ and $53_1$, it can be judged that the automatic transmission T is constructed using the first and second separating plate $55_{7P}$ and $56_{7P}$ for the 7-position type. On the other hand, if the identification holes j and k cannot be visually viewed, it can be judged that the automatic transmission T is constructed using the first and second separating plate $55_{6P}$ and $56_{6P}$ for the 6-position type. Thus, it is possible to reliably prevent the occurrence of the mis-assembling.

The operation of the hydraulic pressure control circuit O in the automatic transmission T having the above-described construction will be described below.

When the selection level is in the "D4" range (the first-shift to fourth-shift automatic shiftable range) or the "D3" range (the first-shift to third-shift automatic shiftable range), the shift solenoid $SL_1$ and $SL_2$, in the hydraulic pressure control circuit O, are controlled, as shown in Table 1, to select any of the first gear-shift stage to the fourth gear-shift stage, based on a shifting map using the throttle opening degree TH, detected by the throttle opening degree sensor $S_1$, and the vehicle speed V detected by the vehicle speed sensor $S_4$ as parameters.

TABLE 1

| Shift solenoid | | Position of selector lever | | | |
| --- | --- | --- | --- | --- | --- |
| $SL_1$ | $SL_2$ | D4, D3 | 7P"2" | 6P"2" | 7P"1" |
| OFF | ON | first speed | signal not used | second speed | first speed holding |
| ON | ON | second speed | second speed | second speed | second speed |
| ON | OFF | third speed | third speed | third speed | second speed |
| OFF | OFF | fourth speed | signal not used | second speed | second speed |

When the first gear-shift stage in the "D4" range and the "D3" range is selected, the shift solenoid $SL_1$ is turned OFF (closed), and the shift solenoid $SL_2$ is turned ON (opened), so that the 1–2 shifting valve 37 is moved rightwardly by a hydraulic pressure against the spring, thereby cutting off the oil passages connected to the second-shift clutch $C_2$, the third-shift clutch $C_3$, the fourth-shift-reverse clutch $C_{4R}$ and their accumulators $A_2$, $A_3$ and $A_{4R}$. On the other hand, in the "D4" range, the "D3" range, the "2" range and the "1" range, the line pressure passed through the manual valve 32 is constantly supplied to the first-shift clutch $C_1$ and the first-shift accumulator $A_1$ and, hence, the first gear-shift stage is established.

When the second gear-shift stage in the "D4" range and the "D3" range is selected, both of the two shift solenoids $SL_1$ and $SL_2$ are moved leftwardly by the spring, and the 2–3 shifting valve 38 is moved rightwardly by the spring. Therefore, the oil passages connected to the third-shift clutch $C_3$, the fourth-shift-reverse clutch $C_{4R}$ and their accumulators $A_3$ and $A_{4R}$ are cut off, so that the clutch pressure is applied to the second-shift clutch $C_2$ and the second-shift accumulator $A_2$ to establish the second gear shift stage.

When the third gear-shift stage in the "D4" range and the "D3" range is selected, the shift solenoid $SL_1$ is turned ON (opened), and the shift solenoid $SL_2$ is turned OFF (closed), so that the 1–2 shifting valve 37 is moved leftwardly by the spring and by the hydraulic pressure; the 2–3 shifting valve 38 is moved leftwardly against the spring, and the 3–4 shifting valve 39 is moved rightwardly by the spring. As a result, the oil passages connected to the second-shift clutch $C_2$, the fourth-shift-reverse clutch $C_{4R}$ and their accumulators $A_2$ and $A_{4R}$ are cut off, so that the clutch pressure is applied to the third-shift clutch $C_3$ and third-shift accumulator $A_3$ to establish the third-gear shift stage.

When the fourth gear-shift stage in the "D4" range is selected, both of the two shift solenoids $SL_1$ and $SL_2$ are turned OFF (closed), so that the 1–2 shifting valve 37 is moved leftwardly by the spring and by the hydraulic pressure, and the 2–3 shifting valve 38 and the 3–4 shifting valve 39 are moved leftwardly by the hydraulic pressure against the spring. As a result, the oil passages connected to the second-shift clutch $C_2$, the third-shift clutch $C_3$ and their accumulators $A_2$ and $A_3$ are cut off, thereby permitting the clutch pressure to be applied to the fourth-shift reverse clutch $C_{4R}$ and the fourth-shift accumulator $A_{4R}$ to establish the fourth gear-shift stage.

When the selection lever is in the "2" range (the second-shift fixing range) in the 7-position type automatic transmission T, if the two shift solenoids $SL_1$ and $SL_2$ are on (opened) and OFF (closed), respectively, in the same manner as in the "D4" range and the "D3" range, the clutch hydraulic pressure is applied to the third-shift clutch $C_3$ and the third-shift accumulator $A_3$ to establish the third gear shift. If both of the two shift solenoids $SL_1$ and $SL_2$ are turned ON (opened), the clutch hydraulic pressure is applied to the second-shift clutch $C_2$ and the second-shift accumulator $A_2$ to establish the second gear shift stage. Thus, it is possible to achieve the downshifting from the third gear-shift to the second gear-shift and the fixing of the second gear-shift.

In the "2" range of the 6-position type automatic transmission T, following signals are not used: a signal indicative of command to turn OFF (close) and ON (open) the two shift solenoids $SL_1$ and $SL_2$, respectively, and a signal indicative of command to turn OFF (close) both of the two shift solenoids $SL_1$ and $SL_2$.

If the two shift solenoids $SL_1$ and $SL_2$ are ON (opened) and OFF (closed), respectively, when the selection lever is in the "2" range in the 6-position type automatic transmission T, the 1–2 shifting valve 37 is moved leftwardly by the spring; the 2–3 shifting valve 38 is moved leftwardly by the hydraulic pressure against the spring, and the 3–4 shifting valve 39 is moved rightwardly by the spring. This permits the clutch pressure from the CPC valve 42 to be transmitted via the 1–2 shifting valve 37, the 2–3 shifting valve 38 and the 3–4 shifting valve 39 to the third-shift clutch $C_3$ and the third-shift accumulator $A_3$, thereby establishing the third gear shift stage.

If the two shift solenoids $SL_1$ and $SL_2$ are OFF (closed) an ON (opened), respectively, the 1–2 shifting valve 37 is moved rightwardly by the hydraulic pressure against the spring; the 2–3 shifting valve 38 is moved rightwardly by the spring, and the 3–4 shifting valve 39 is moved leftwardly by the hydraulic pressure against the spring. As a result, the line pressure passed through the manual valve 32 is transferred through the oil passage $L_5$, the oil hole c and the oil passage $L_1$ shown in FIG. 5 to the 1–2 shifting valve 37 and transmitted from the latter via the second-shift clutch $C_2$ and the second-shift accumulator $A_2$ to establish the second gear-shift stage.

If both the two shift solenoids $SL_1$ and $SL_2$ are ON (opened), the 1–2 shifting valve 37 is moved leftwardly; the 2–3 shifting valve 38 is moved rightwardly by the spring, and the 3–4 shifting valve 39 is moved rightwardly by the spring. As a result, the clutch pressure from the CPC valve 42 is transmitted via the 1–2 shifting valve 37 and the 2–3 shifting valve 38 to the second-shift clutch $C_2$ and the second-shift accumulator $A_2$ to establish the second gear-shift stage.

If both the two shift solenoids $SL_1$ and $SL_2$ are OFF (closed), the 1–2 shifting valve 37 is moved leftwardly by the spring, so that the clutch pressure from the CPC valve 42 is transmitted via the 1–2 shifting valve 37 to the 2–3 shifting valve 38. At this time, the shift solenoid $SL_2$ is OFF (closed) and, hence, the 2–3 shifting valve 38 is intended to be moved leftwardly by the hydraulic pressure applied to a right end of a spool against the spring. However, the line pressure passed through the oil passage $L_3$, the oil hole g, the oil passage $L_6$, the 3–4 shifting valve 39, the oil passage $L_{11}$, the oil hole h and the oil passage $L_8$ shown in FIG. 5 is applied to a left end of the spool of the 2–3 shifting valve 38 to move the 2–3 shifting valve 38 rightwardly, by the fact that the 3–4 shifting valve 39 has been moved leftwardly. As a result, the clutch pressure is transmitted via the 1–2 shifting valve 37 to the 2–3 shifting valve 38 and then from the latter to the second-shift clutch $C_2$ and the second-shift accumulator $A_2$ to establish the second gear-shift stage.

When the selection level is in the "1" range (the first-shift fixing range) in the 7-position type automatic transmission T, if the shift solenoids $SL_1$ and $SL_2$ are ON (opened) and ON (opened), or ON (opened) and OFF (closed), or OFF (closed) and OFF (closed), respectively, the 1–2 shifting valve 37 is moved leftwardly in any case, so that the clutch pressure from the CPC valve 42 is passed to the 2–3 shifting valve 38. At this time, the line pressure, passed through the manual valve 32, is transmitted through the oil passage $L_4$, the oil hole b, the oil passage $L_3$, the oil passage $L_7$, the oil hole f and the oil passage $L_8$ which in FIG. 3, is to the left end of the 2–3 shifting valve 38, thereby retaining the 2–3 shifting valve 38 at the rightwardly moved position, irrespective of the ON or OFF state of the shift solenoid $SL_2$. This permits the clutch pressure to be transmitted through the 2–3 shifting valve 38 to the second-shift clutch $C_2$ and the second-shift accumulator $A_2$ to establish the second gear shift stage.

If the shift solenoids $SL_1$ and $SL_2$ are OFF (closed) and ON (opened), respectively, the 3–4 shifting valve 39 is moved leftwardly by the hydraulic pressure, thereby causing the line pressure, passed through the manual valve 32, to be transmitted through oil passage $L_4$, the oil hole b, the oil passage $L_3$, the oil passage $L_7$, the orifice e, the oil passage $L_6$, the 3–4 shifting valve 39, the oil passage $L_9$, the oil hole i, the oil passage $L_{10}$ and the 1–2 shifting valve 37 to the first-shift holding clutch $C_{LH}$ to establish the first-shift holding gear-shift stage.

At the same time, the oil discharged from the second-shift clutch $C_2$ and the second-shift accumulator $A_2$ is discharged through the 1–2 shifting valve 37, the oil passage $L_1$, the oil hole a and the oil passage $L_2$ shown in FIG. 3.

When the selection lever is in the "R" range (the reverse range), the shift solenoid $SL_1$ is turned ON (opened), while the shift solenoid $SL_2$ is turned OFF (closed), and the 1–2 shifting valve 37 is moved leftwardly by the spring and by the hydraulic pressure. This causes the line pressure, passed through the manual valve 32, to be transmitted via the 1–2 shifting valve 37 to the servo valve 35 to move the servo valve 35 rightwardly, thereby switching the regulator gear SG to the reverse position. Thereafter, the clutch pressure is supplied to the fourth-shift-reverse clutch $C_{4R}$ and the fourth-shift accumulator $A_{4R}$ to establish the backward gear-shift stage.

Thus, both of the 7-position and 6-position type automatic transmissions T can be produced commonly using the torque converter casing 51 m, the main valve body 52, the secondary valve body 53, the servo body 54 and the third separating plate 57, only by replacing the first separating plate $55_{7P}$ and $55_{6P}$ as well as the second separating plate $56_{7P}$ and $56_{6P}$ by each other. Moreover, the two first separating plate $55_{7P}$ and $55_{6P}$ can be produced at a low cost only by replacing the positions of an ejecting pin in a common press die with each other, and likewise, the second separating plate $56_{7P}$ and $56_{6P}$ can be also produced at a low cost only by replacing the positions of an ejecting pin in a common press die with each other.

Although the embodiment of the present invention has been described in detail, it will be understood that the present invention is not limited to the above-described embodiment, and various modifications in design may be made without departing from the spirit and scope of the invention defined in claims.

For example, the present invention is also applicable to a hydraulic pressure control system for apparatus other than the automatic transmission for the vehicle. The number of members superimposed and clamped is not limited to that described in the embodiment and may be two or more including the valve body and the separating plate. For example, the function of the separating plate, in accordance with the present invention, may be possessed by the valve body. The identification mark is not limited to the identification hole and may be a so-called mark, such as, a punch mark, a paint, a notch and the like.

What is claimed is:

1. A hydraulic pressure control system including a valve body assembly having a plurality of oil passages formed therein, wherein said valve body assembly comprises at least two members superimposed and clamped one on another and opposed to each other, one of said members conducting a switching over of a communication condition between the oil passages provided in the other member.

2. A hydraulic pressure control system according to claim 1, wherein said switch-over of the communication condition between the oil passages is a switching over on one of the following, the connection of one oil passage to another oil passage, a switching-over of the connection and disconnection between the oil passages and a switching-over of the presence and absence of a throttle.

3. A hydraulic pressure control system according to claim 1 or 2, wherein said one of said members is a separation plate, and said other member is a valve body which has a hydraulic pressure control valve and a plurality of oil passages formed therein.

4. A hydraulic pressure control system according to claim 1 or 2, wherein said one of said members includes an identification mark visible from outside said one of said members.

5. A hydraulic pressure control system according to claim 3, wherein said one of said members includes an identification mark visible from outside said one of said members.

6. A hydraulic pressure control system according to claim 1 or 2, wherein said valve body assembly controls hydraulic pressure in an automatic transmission for a vehicle, and said one of said members is for switching-over the number of shifting hydraulic engaging elements.

7. A hydraulic pressure control system according to claim 3, wherein said valve body assembly controls hydraulic pressure in an automatic transmission for a vehicle, and said one of said members is for switching-over the number of shifting hydraulic engaging elements.

8. A hydraulic pressure control system according to claim 4, wherein said valve body assembly controls hydraulic pressure in an automatic transmission for a vehicle, and said one of said members is for switching-over the number of shifting hydraulic engaging elements.

9. A hydraulic pressure control system according to claim 5, wherein said valve body assembly controls hydraulic pressure in an automatic transmission for a vehicle, and said one of said members is for switching-over the number of shifting hydraulic engaging elements.

* * * * *